(12) United States Patent
Cozzari et al.

(10) Patent No.: US 7,247,833 B2
(45) Date of Patent: Jul. 24, 2007

(54) APPARATUS AND METHOD FOR THE POSITION CHECKING OF A MECHANICAL PART

(75) Inventors: Alberto Cozzari, San Giorgio Di Piano (IT); Carlo Dall'Aglio, Castello D'Argile (IT)

(73) Assignee: Marposs Societa' per Azioni, Bentivoglio (BO) (IT)

( * ) Notice: Subject to any disclaimer, the term of this patent is extended or adjusted under 35 U.S.C. 154(b) by 17 days.

(21) Appl. No.: 10/563,512

(22) PCT Filed: Jul. 15, 2004

(86) PCT No.: PCT/EP2004/051513

§ 371 (c)(1),
(2), (4) Date: Jan. 6, 2006

(87) PCT Pub. No.: WO2005/011913

PCT Pub. Date: Feb. 10, 2005

(65) Prior Publication Data
US 2006/0151684 A1 Jul. 13, 2006

(30) Foreign Application Priority Data
Jul. 17, 2003 (IT) .......................... BO2003A0430

(51) Int. Cl.
*H01J 40/14* (2006.01)
(52) U.S. Cl. .................. 250/221; 250/559.29
(58) Field of Classification Search ............... 250/221, 250/559.29, 548, 559.3, 559.33; 356/399–401
See application file for complete search history.

(56) References Cited

U.S. PATENT DOCUMENTS

| 3,471,234 A | * | 10/1969 | Studebaker | .................. 356/3 |
| 3,912,925 A | | 10/1975 | Gaskell | |
| 2001/0017699 A1 | | 8/2001 | Egelhof | |

FOREIGN PATENT DOCUMENTS

| DE | 196 29 616 | 1/1998 |
| JP | 9-300178 | 11/1997 |

* cited by examiner

*Primary Examiner*—Que T. Le
(74) *Attorney, Agent, or Firm*—Dickstein Shapiro LLP

(57) ABSTRACT

An apparatus for checking the integrity of tools includes an optoelectronic system (7) with a laser beam (21), a base (6) movable along a longitudinal direction (X) for enabling displacements between tool and optoelectronic system and a device for checking the mutual position including, for example, a transducer (9,10). A sensor (22) of the optoelectronic system detects the interruption of the beam and, on the basis of the transducer signal at said interruption and on the comparison with a known value, the integrity of the tool is determined. A coupling mechanism (24) of the optoelectronic system coupled at the base enables oscillations of the former along a transversal reference surface, that define a sensitive delimited area (33). The oscillations are controlled by means of a motor (26) and interruptions of the beam are detected and signalled by the sensor the moment that the end of the tool interferes with the sensitive delimited area.

18 Claims, 2 Drawing Sheets

APPARATUS AND METHOD FOR THE POSITION CHECKING OF A MECHANICAL PART

TECHNICAL FIELD

The invention relates to an apparatus for checking the position of a mechanical part, more particularly a free end of an elongate tool, including a frame, stationary with respect to the mechanical part to be checked, a base carrying a mechanical support, the base and the frame being mutually movable along a longitudinal feed direction, an emitter for generating a light beam along a trajectory transversal with respect to the longitudinal feed direction, and a sensor, arranged along the trajectory of the light beam, the emitter and the sensor being coupled to the mechanical support in mutually defined positions, the sensor being adapted for providing signals indicative of the reception of the light beam, a transducer device for checking the mutual position between the base and the frame, and a processing, display and control unit, connected to the sensor and to the transducer device for processing the signals of the sensor and for identifying the mutual position between the base and the frame at the interruption of the light beam.

The invention also relates to a method for checking an elongate tool, that is substantially arranged along a longitudinal direction and includes a free end, by means of an apparatus including an emitter for generating a light beam along a transversal trajectory and a sensor for detecting the interruption of the light beam, a base, movable along a longitudinal direction with respect to the tool to be checked, that carries, by means of a coupling mechanism, said emitter and said sensor, and a transducer device for checking the mutual position between the base and the tool to be checked, the method including a mutual feed displacement along the longitudinal direction between the movable base and the tool to be checked for causing the approach of the light beam towards the free end of the tool, and a detection of the interruption of the light beam in the course of this displacement.

Apparatuses for automatically checking the position or the integrity of tools are often utilized in machine tools of various types.

For example, in the case of machine tools as numeric control machining centers, the condition of the tools can be checked either in the course of the actual machining phase when the tool is coupled to the spindle, or in the tool storage magazine area. This second possibility can be more advantageous in terms of time, because the machining is not slowed down by the checking operations that are concurrently carried out on tools next to being utilized located in another area of the machine.

BACKGROUND ART

Existing known systems for checking the integrity of elongate tools, like drills or centers or boring bars, stored in the machine storage magazine and substantially arranged along parallel axial directions, include contact detecting systems. More particularly, an embodiment foresees the use of a mechanical feeler with a flat surface that is abutted, by the action of a movable slide, against the tool to be checked in the axial direction. Upon contact occurring between feeler and tool, a signal is provided for controlling the detection of the position of the slide, enabling to check the length and thus the integrity of the tool. The flat surface of the feeler—transversally arranged with respect to the feed direction of the slide—in general has a not negligible extension (for example, a few tenths of millimeters), for assuring contact with the end of the tool even in the case the latter is not perfectly aligned along its associated axial direction.

This condition is rather frequent, in consideration of the fact that each tool (more specifically, its associated tool-holder) is coupled to a seat of the storage magazine with a not too accurate, slack coupling, conversely as to what occurs when the tool is coupled to the spindle in the course of the machining phase.

The use of contact detecting systems for checking purposes is critical in consideration of the possible damage that contact with the feeler can cause to the tools, especially in the case of tools with particular delicate coatings. There are known apparatuses and methods that utilize light beams for checking the dimensions or the presence, the arrangement and the possible breakages of tools.

U.S. Pat. No. 3,912,925 discloses, for example, a drilling machine in which the devices for checking the integrity of the tools utilize transversal light beams with limited thickness. The beams are substantially coplanar to the feed direction of the tools. The non-interruption of the light beam at a specific position on the tool is detected and notifies an anomalous condition of the tool. Devices as those disclosed in patent No. U.S. Pat. No. 3,912,925 are not suitable for checking tools arranged in the tool storage magazine, owing to the possible inclinations of the tools with respect to the axis due, as previously, to the inaccurate coupling between tool and associated seat.

Japanese patent application No. JP-A-9/300178 and its English abstract disclose the checking of a rotating elongate tool coupled to the spindle of the machine tool, in which the position of the end of the tool is checked by detecting, by means of a linear sensor, the partial interruption of a substantially plane beam or bundle of light. The presence of the linear sensor enables to obtain also information on other characteristics of the tool (diameter, length, type of tool), by processing signals indicative of the quantity of intercepted light.

The embodiment according to the former Japanese patent application is particularly expensive, especially in those cases when there is the need to simply check the integrity of the tool.

DISCLOSURE OF THE INVENTION

An object of the present invention is to provide an apparatus for detecting the presence of a mechanical part, and more specifically for checking the integrity of elongate tools, that can be utilized even in the case the positioning of the part to be checked is not extremely precise, that avoids causing damage to the former part and is accurate, reliable and inexpensive.

A further object of the invention is to provide an associated checking method with particular features of simplicity and safety.

These and other objects and advantages are achieved by an apparatus according to claim 1 and a method according to claim 11.

BRIEF DESCRIPTION OF THE DRAWINGS

The invention is hereinafter described in detail with reference to the enclosed sheets of drawings, given by way of non limiting example only, wherein.

BEST MODE FOR CARRYING OUT THE INVENTION

Figure 1:
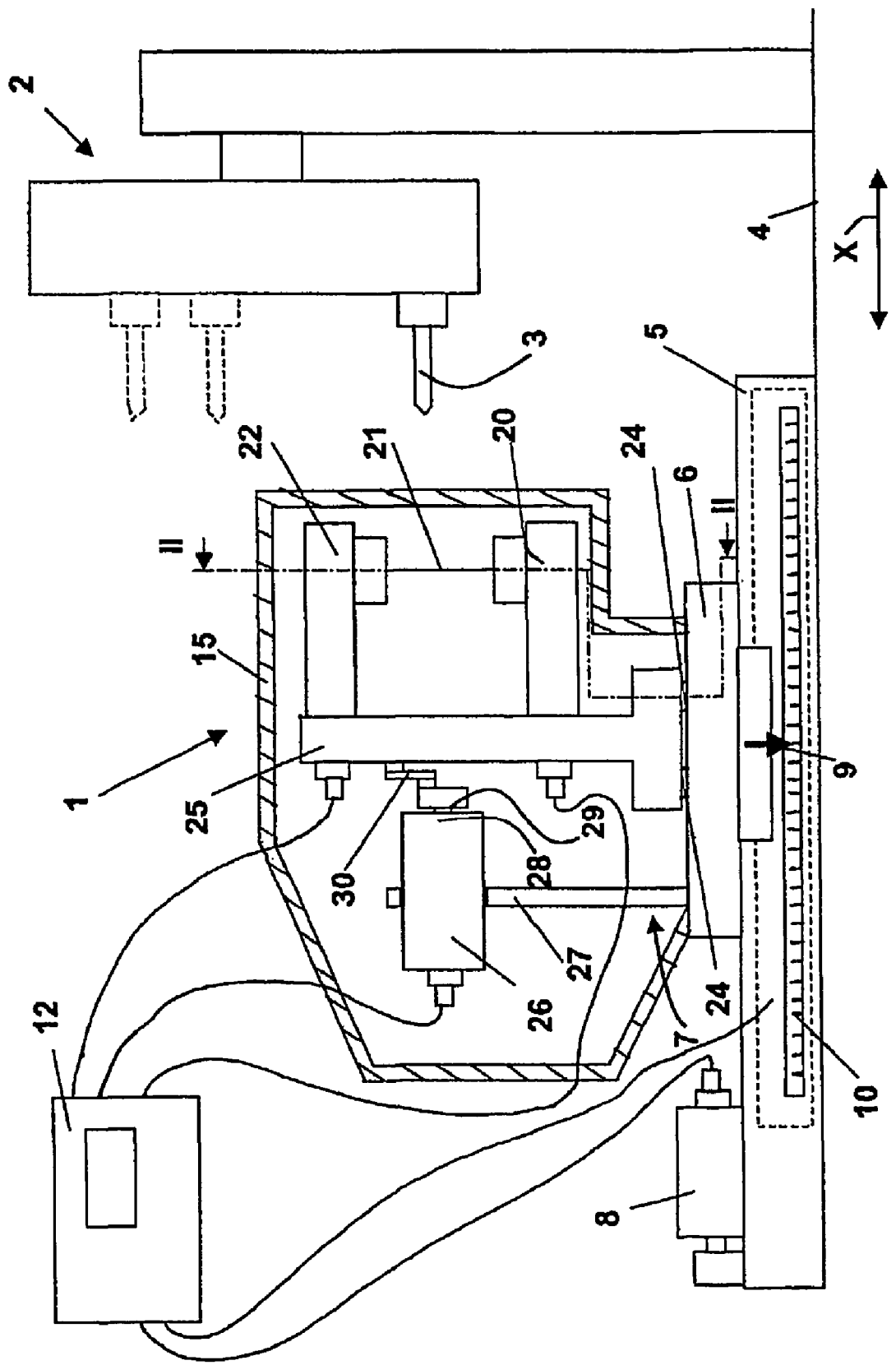
FIG. 1 is a side view, in an extremely simplified form and with some elements cross-sectioned, of a checking apparatus according to a preferred embodiment of the invention.

FIG. 1 illustrates a checking apparatus 1 represented in course of checking a mechanical part, in particular an elongate tool 3 coupled to a storage magazine 2 of a machine tool, for example a machining center, per se known and herein not illustrated.

A common bed 4 supports the storage magazine 2 and the apparatus 1. More specifically, a frame of the apparatus, shown in simplified form in FIG. 1 and identified by reference number 5, is rigidly coupled to bed 4 and carries a slide 6—movable with respect to frame 5 and consequently with respect to tool 3, along a longitudinal feed direction X—that forms a base for a hereinafter disclosed optoelectronic checking system 7.

A displacement system for controlling and checking the mutual position between base 6 and frame 5 includes, for example, a motor 8 that activates the displacements of the slide 6, with respect to the frame 5, and a position checking transducer device, for example a linear transducer. The linear transducer, that is schematically identified in FIG. 1 by arrow 9 and graduated scale 10 (integral with slide 6 and frame 5, respectively), provides signals indicative of the position of base 6 on frame 5 to a processing, display and control unit 12 that is also electrically connected to the motor 8. The displacement system can be implemented in a different way with respect to the way shown in simplified form in FIG. 2: the mutual position between the movable parts can be controlled by means of an instrument of another type, for example a rotative transducer (or an "encoder"), or it is possible to use a step motor for motor 8 for generating controlled displacements along the longitudinal direction X.

A casing 15 for the checking system 7 is coupled to base 6 in a way that has not been illustrated in the figures. In FIG. 1 the casing 15 is cross-sectioned along a longitudinal plane in order to show some components of the checking system 7 and more specifically:

an emitter 20, i.e. a device for generating a light beam 21, specifically a laser beam, along a transversal trajectory;

a receiver 22, i.e. a sensor, arranged along said trajectory, for detecting the correct reception of the light beam 21 or the non-reception of light owing to the interruption of the beam 21;

a mechanical support 25 to which the emitter 20 and the receiver 22 are coupled in known and mutually defined positions, and an associated coupling mechanism coupling the support 25 to the base 6, with fulcrum devices, in particular a pair of deformable fulcra 24 with pairs of crossed laminae. The fulcra 24 are aligned and define an axis of oscillation that is substantially parallel with respect to the longitudinal feed direction X;

an activation device, more particularly an electric motor 26, mechanically coupled to the base 6 by means of a stanchion shown in simplified form in FIG. 1 and identified by reference number 27, including a rotating spindle 28, a plate 29 that rotates with the spindle, and a connecting rod 30 with its ends coupled, in a freely rotating way, to the mechanical support 25 and to an eccentric area of the plate 29.

Figure 2:
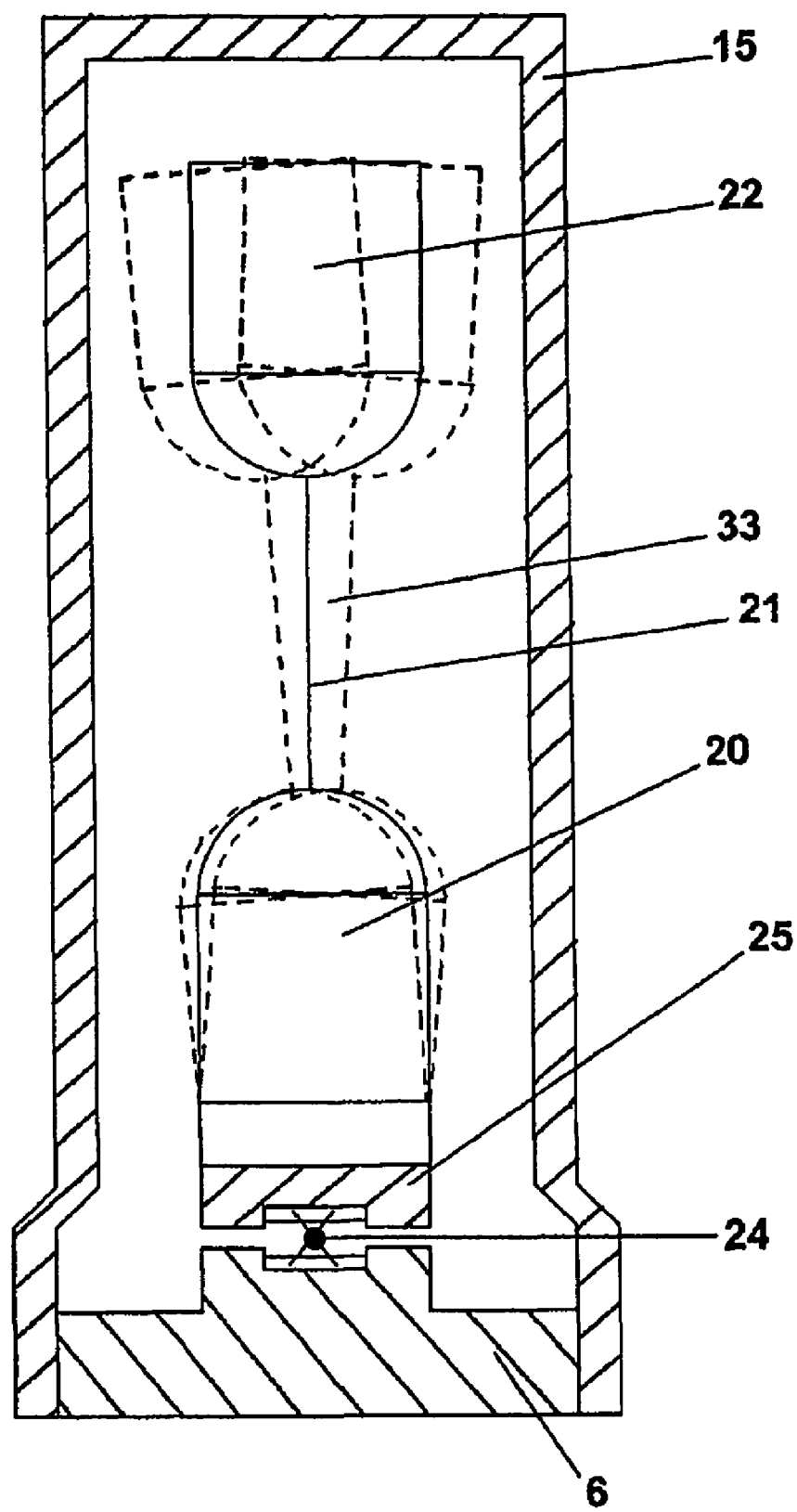
FIG. 2 is an enlarged cross-sectional view of the apparatus of FIG. 1 along line II—II of FIG. 1.

The emitter 20, the receiver 22 and the electric motor 26 are electrically connected to the processing, display and control unit 12, as shown in simplified form in FIG. 1. Rotations of the spindle 28 of the electric motor 26 cause, through the transmission elements that include the plate 29 and the connecting rod 30, oscillation displacements of the mechanical support 25 about the axis defined by the fulcra 24, and consequent oscillations of the light beam 22 about the former axis. The dashed line in FIG. 2 represents the positions taken by the mechanical support 25 and by the laser beam 21 in the course of said oscillations. As shown in FIG. 2, the oscillations of the beam 21 substantially occur along the plane of said figure, i.e. along a plane transversal reference surface, more particularly perpendicular to the feed direction.

The oscillations of the beam 21 range within an angle that is defined by various manufacturing parameters of the system (layout dimensions of the transmission elements 29 and 30, mutual distances between the coupling of the connecting rod 30 to mechanical support 25, beam 21 and fulcra 24, . . . ) and that delimits an area identified in FIG. 2 by reference number 33.

The apparatus operates in the following manner.

By starting from a non-working position, that corresponds, for example, to the one shown in FIG. 1, longitudinal displacements of the base 6 with respect to the frame 5 are caused by motor 8 that receives specific controls from unit 12. Concurrently to these displacements, that cause the checking system 7 to displace towards the storage magazine 2 that stores the tool 3 to be checked, controls arriving from unit 12 activate emitter 20 and motor 26 thereby causing the generating of the laser beam 21 and, by means of the transmission elements 29 and 30, oscillations, at a preset frequency (for example in the order of 10 Hz) about the axis defined by fulcra 24. Signals indicating the reception of the beam 21 are transmitted from sensor 22 to unit 12.

Whenever there occurs, in the course of the feed displacement of base 6, that the free end of tool 3 intercepts the reference surface on which the beam 21 oscillates (more specifically the delimited area 33 of said surface), by virtue of the high frequency of the oscillations, the beam 21 undergoes at least a temporary interruption, that is immediately detected by sensor 22. On the basis of the signals arriving from sensor 22 and from the linear transducer 9, 10, unit 12 identifies the position of the slide 6 at the moment in time when the beam 21 is interrupted this position is indicative of the position of the free end of the tool 3, and thus the length of tool 3. On the basis of the detected position value and on known values identifying the nominal length (or the length detected in a previous check) of the tool 3, it is possible to obtain information regarding the condition of the tool (for example, if the tool is broken, or deformed, or the center is worn out).

In practice, the beam 21 defines, by oscillating about the axis of fulcra 24, an area (33) that is sensitive to the interference of the elongate tool 3.

The advantageous aspects in terms of simplicity and limited costs of the solution according to the invention are evident, for example, with respect to the solution disclosed in the formerly mentioned patent application No. JP-A-9/300178, which needs the presence, among other things, of a linear sensor.

A method according to the invention can include other and/or additional steps with respect to what has been herein so far described, intended for improving the already high performance of the apparatus according to the invention. For example, it can be foreseen to control the motor 8 in order that it accomplishes first the already mentioned feed displacements of the base 6 along the longitudinal direction X, at a certain speed $V_1$, that is relatively high with respect to the oscillation frequency of the mechanical support 25, then, as soon as the interruption of the beam 21 is detected by sensor 22, motor 8 is stopped, controlled in order to generate an additional mutual displacement, for slightly retracting the slide 6 until the beam 21 is again received by receiver 22, and generate a second feed displacement of base 6 at speed $V_2$, definitely slower than $V_1$ (for example: $V_1$=100 mm/sec, $V_2$=2 mm/sec). The position of the end of the tool 3 is detected on the basis of signals provided by the sensor 22 that, in the course of the second feed displacement, detect the newly generated interruption of the beam 21. In this way, the limited feed displacement speed $V_2$ enables to detect with the utmost accuracy the initial interference between the free end of the tool 3 and the delimited area 33 of the reference surface, i.e. the interruption of the beam 21 as soon as the interference occurs, while the rapidity of the checking operations is guaranteed by virtue of the higher speed $V_1$. It should be realized that the further retraction displacement can be stopped on the basis of the signals arriving from sensor 22, or in another way (upon the elapse of a preset time interval, a preset number of revolutions of the motor 8, etc.).

An alternative embodiment foresees that, after the feed at speed $V_1$ and the stop, a retraction displacement takes place at a slower speed (for example $V_2$) and the position of the end of the tool 3 be checked on the basis of signals of the sensor 22 that detect, in the course of the retraction, the instant when the reception of the beam 21 is reset.

Of course, an apparatus according to the invention can also be used for detecting the proper condition of the tool 3 (or other mechanical part) by means of different checking procedures or methods. For instance, before activating the emitter 20, the base 6 can be moved and stopped at a position at which the light beam 21 should be interrupted by the tool 3 to be checked. Then, without moving to base 6, emitter 20 can be activated and oscillations of support 25 started. In this case, lacking of interference between beam 21 and tool 3 indicate the not proper condition of the tool 3.

Many variants to the checking apparatus according to the invention are possible, as regards, for example, the arrangement of the emitter 20 and the receiver 22, that can be exchanged with respect to what has been shown in the figures, or the design of the fulcra 24.

Other embodiments of the invention foresee that mechanical support 25, emitter 20 and receiver 22 have shape and arrangement such that the light beam 21 lies along a direction substantially parallel to bed 4. In this case, the mechanical support 25 is coupled to base 6 in another way—with fulcra 24 or a coupling mechanism of another type—such that, for example, the angle defined by the oscillations of the beam 21 be centered along an axis also substantially parallel to bed 4. A different arrangement can foresee a coupling mechanism for enabling rotations of the beam 21 (arranged as shown in the figures or along a direction substantially parallel to bed 4), about an axis parallel to and spaced out with respect to the beam 21 along the longitudinal direction X. In this case, the transversal reference surface is cylindrical instead of plane, but this does not have substantial relevance in terms of attaining high performance of the apparatus, in consideration of the delimited extension of the area 33 that is sensitive to the interference of the elongate tool 3.

Other alternative embodiments foresee the use of light beams of other nature with respect to the laser, but analogous insofar as characteristics as, for example, the transversal dimensions are concerned.

Other embodiments foresee also that the mutual displacements between base 6 and tool 3, or other mechanical part to be checked, occur by means of displacements of the tool 3 with respect to the bed 4 and that suitable instruments check the mutual position between tool 3 and base 6.

The environment and the hereinbefore briefly illustrated conditions (i.e. the checking of the tool 3 arranged in the storage magazine 2, before being utilized in the machine tool for performing machinings) obviously provide just a practical example of the invention.

In fact, apparatuses and methods according to the invention can be utilized for performing checkings of tools mounted in the spindle of machine tools in the course of the machining or in other working conditions, or in applications that are completely separate from the machine tools for the checking of different mechanical parts.

The invention claimed is:

1. An apparatus for checking the position of a mechanical part, more particularly a free end of an elongate tool comprising:
   a frame, stationary with respect to the mechanical part to be checked,
   a base carrying a mechanical support, the base and the frame being movable with respect to each other along a longitudinal feed direction,
   an emitter for generating a light beam along a trajectory transverse with respect to the longitudinal feed direction, and a sensor, arranged along the trajectory of the light beam, the emitter and the sensor being coupled to the mechanical support in mutually defined positions, the sensor being adapted for providing signals indicative of reception and interruption of reception of the light beam,
   a transducer device for checking the relative position between the base and the frame,
   a processing, display and control unit, connected to the sensor and to the transducer device, for processing said signals of the sensor and for identifying the relative position between the base and the frame at said interruption of reception of the light beam, and
   a coupling mechanism between the mechanical support and the base adapted for enabling oscillations of the light beam with respect to the base substantially along a reference surface, and an activation device and transmission elements adapted for controlling said oscillations of the light beam with respect to the base.

2. The apparatus according to claim 1, wherein the coupling mechanism and the transmission elements enable oscillations of the light beam in a delimited area of said reference surface.

3. The apparatus according to claim 1, wherein the longitudinal feed direction is substantially perpendicular to the reference surface.

4. The apparatus according to claim 1, wherein said reference surface is substantially plane.

5. The apparatus according to claim 1, wherein said coupling mechanism includes fulcrum devices coupled to the mechanical support and to the base.

6. The apparatus according to claim 5, wherein said devices define an axis of oscillation that is substantially parallel with respect to the longitudinal feed direction.

7. The apparatus according to claim 6, wherein the fulcrum devices are coupled to the mechanical support such that said axis of oscillation is substantially perpendicular to and substantially coplanar with the trajectory of the light beam.

8. The apparatus according to claim 7, wherein the activation device includes a motor with a spindle having an axis of rotation that is substantially parallel with respect to the longitudinal feed direction, said transmission elements include a connecting rod coupled at one end to the mechanical support and at the other end to the spindle of the motor, in an eccentric position with respect to the axis of rotation.

9. The apparatus according to claim 1, wherein the light beam has transverse dimensions that do not exceed 2 mm.

10. The apparatus according to claim 1, wherein the light beam is a laser beam.

11. A method for checking an elongate tool, that is substantially arranged along a longitudinal direction and includes a free end, by means of an apparatus including an emitter for generating a light beam along a transversal trajectory and a sensor for detecting the interruption of the light beam, a base, movable along the longitudinal direction with respect to the tool to be checked, that carries, by means of a coupling mechanism, said emitter and said sensor, and a transducer device for checking the mutual position between the base and the tool to be checked, the method including
- displacing, along the longitudinal direction, the movable base relative to the tool to be checked, thereby causing the light beam to approach the free end of the tool, and
- detecting the interruption of the light beam, in the course of said displacing step, when said light beam is interrupted by said free end of the tool,
- wherein oscillations of the light beam with respect to the base occur substantially along a reference surface transverse to said longitudinal direction, and concurrently with the mutual feed displacement, the oscillations being enabled by the coupling mechanism and being controlled by an activation device.

12. The method according to claim 11, wherein said oscillations of the light beam have a preset frequency, said preset frequency and a speed of the mutual feed displacement along the longitudinal direction of the movable base relative to the tool are such that initial interference between the free end of the tool and said transverse reference surface causes the interruption of the light beam.

13. The method according to claim 12, wherein said preset frequency is not less than 10 Hz.

14. The method according to claim 11, wherein the longitudinal direction is substantially perpendicular to the transverse reference surface.

15. The method according to claim 14, wherein said oscillations occur about a longitudinal axis that is substantially perpendicular to the trajectory of the light beam and coplanar with it.

16. The method according to claim 11, further comprising:
- performing an additional relative displacement, along the longitudinal direction, between the movable base and the tool to be checked, in a direction opposite with respect to said displacing step, in order to cause the displacement of the light beam away from the tool,
- performing a second displacement in the same direction as said displacing step, said oscillations of the light beam with respect to the base also occurring in the course of said second displacement, and
- performing a second detection of the interruption of the light beam during said second displacement,
- wherein said second displacement has a slower speed with respect to the speed of said displacing step.

17. The method according to claim 11, further comprising:
- performing an additional relative displacement, along the longitudinal direction, between the movable base and the tool to be checked, in a direction opposite with respect to said displacing step, in order to cause movement of the light beam away from the tool, said oscillations of the light beam with respect to the base also occurring in the course of said additional relative displacement, and
- performing an additional detection of the light beam during said additional relative displacement, wherein said additional relative displacement has a slower speed with respect to the speed of said displacing step.

18. The apparatus according to claim 1, wherein said reference surface is transverse to said longitudinal feed direction.

* * * * *